US012562886B2

(12) United States Patent　　　　(10) Patent No.: US 12,562,886 B2
Adir et al.　　　　　　　　　　　　(45) Date of Patent: Feb. 24, 2026

(54) FAST POLYNOMIAL EVALUATION UNDER FULLY HOMOMORPHIC ENCRYPTION BY PRODUCTS OF DIFFERENCES FROM ROOTS USING ROTATIONS

(71) Applicant: International Business Machines Corporation, Armonk, NY (US)

(72) Inventors: Allon Adir, Kiryat Tivon (IL); Ramy Masalha, Kafr Qari (IL); Ehud Aharoni, Kfar Saba (IL); Nir Drucker, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 18/603,564

(22) Filed: Mar. 13, 2024

(65) Prior Publication Data

US 2025/0293854 A1　　　Sep. 18, 2025

(51) Int. Cl.
　　*H04L 9/06*　　　　(2006.01)
　　*H04L 9/00*　　　　(2022.01)
　　*H04L 9/30*　　　　(2006.01)
(52) U.S. Cl.
　　CPC .............. *H04L 9/008* (2013.01); *H04L 9/06* (2013.01); *H04L 9/3026* (2013.01)
(58) Field of Classification Search
　　CPC .......... H04L 9/008; H04L 9/06; H04L 9/3026
　　See application file for complete search history.

(56) References Cited

U.S. PATENT DOCUMENTS

| | | | |
|---|---|---|---|
| 8,565,435 B2 | 10/2013 | Gentry et al. | |
| 8,903,083 B2 | 12/2014 | Gentry et al. | |
| 11,546,134 B2 | 1/2023 | No et al. | |
| 2003/0053625 A1 | 3/2003 | Bially et al. | |
| 2010/0020965 A1 | 1/2010 | Gueron et al. | |
| 2012/0039473 A1 | 2/2012 | Gentry et al. | |
| 2013/0216044 A1* | 8/2013 | Gentry .................. | H04L 9/008 |
| | | | 380/277 |

(Continued)

OTHER PUBLICATIONS

United States Non-Final Rejection dated Apr. 18, 2025, 10 pages, in U.S. Appl. No. 18/242,067.

(Continued)

*Primary Examiner* — Rupal Dharia
*Assistant Examiner* — Devin E Almeida
(74) *Attorney, Agent, or Firm* — Yee & Associates, P.C.

(57) ABSTRACT

Evaluating polynomials for use under fully homomorphic encryption (FHE) is provided. An input polynomial of degree n is received, wherein n is equal to 2^m. An input ciphertext containing an input value is also received. The input value is duplicated in n/2 slots. Two plaintext vectors each containing half of the roots in the polynomial are subtracted from the input ciphertext, obtaining second and third ciphertexts, which are multiplied elementwise to produce a result ciphertext comprising n/2 slots. The result ciphertext is rotated by 2^i to generate a rotated ciphertext (i=iteration number) and multiplied by the rotated ciphertext to produce a new result ciphertext, for m−1 iterations. The final result ciphertext is multiplied with a leading coefficient of the polynomial, resulting in a final polynomial evaluation. An operation not supported under FHE is estimated according to the final evaluation.

25 Claims, 5 Drawing Sheets

(56) References Cited

U.S. PATENT DOCUMENTS

| | | | | |
|---|---|---|---|---|
| 2014/0223047 | A1 | 8/2014 | Chavali et al. | |
| 2017/0293913 | A1* | 10/2017 | Gulak | G16H 10/40 |
| 2018/0375639 | A1* | 12/2018 | Lauter | H04L 9/008 |
| 2019/0342270 | A1 | 11/2019 | Laine et al. | |
| 2021/0075588 | A1* | 3/2021 | Khedr | H04L 9/008 |
| 2021/0351913 | A1* | 11/2021 | No | H04L 9/008 |
| 2022/0182220 | A1 | 6/2022 | Shin et al. | |
| 2022/0271922 | A1* | 8/2022 | No | G06F 7/523 |
| 2023/0171084 | A1 | 6/2023 | Kwon et al. | |
| 2025/0080317 | A1 | 3/2025 | Adir et al. | |

OTHER PUBLICATIONS

International Searching Authority, "Notification of Transmittal of the International Search Report and the Written Opinion of the International Searching Authority, or Declaration," Patent Cooperation Treaty May 7, 2025, 09 pages, International Application No. PCT/IB2025/051434.

Okada et al., "Homomorphic polynomial evaluation using Galois structure and applications to BFV bootstrapping", server date 20230902; downloaded by EPO on Sep. 25, 2023, Sep. 1, 2023, pp. 1-33, XP061081106.

Adir et al., "Polynomial Evaluation Under Fully Homomorphic Encryption," U.S. Appl. No. 18/242,067, filed Sep. 5, 2023, 43 pages.

Boura et al., "Simulating Homomorphic Evaluation of Deep Learning Predictions," Cyber Security Cryptography and Machine Learning, CSCML 2019, May 19, 2019, pp. 1-19, vol. 11527, Springer, accessed Mar. 1, 2024, https://link.springer.com/chapter/10.1007/978-3-030-20951-3_20.

Chen et al., "An Encryption Depth Optimization Scheme for Fully Homomorphic Encryption," 2014 International Conference on Identification, Information and Knowledge in the Internet of Things, 2014, pp. 137-141, ieee.org, accessed Mar. 1, 2024, https://ieeexplore.ieee.org/document/7064015.

Chen et al., "Labeled PSI from Fully Homomorphic Encryption with Malicious Security," Proceedings of the 2018 ACM SIGSAC Conference on Computer and Communications Security (CCS '18), Oct. 2018, pp. 1,223-1,237, Association for Computing Machinery, New York, New York, United States, accessed Mar. 1, 2024, https://dl.acm.org/doi/10.1145/3243734.3243836.

Eve, "The Evaluation of Polynomials," Numerische Mathematik, Dec. 1964, pp. 17-21, vol. 6, springer.com, accessed Mar. 4, 2024, https://link.springer.com/article/10.1007/BF01386049.

Franklin et al., "Efficient and Secure Evaluation of Multivariate Polynomials and Applications," Applied Cryptography and Network Security, ACNS 2010, Lecture Notes in Computer Science, 2010, 18 pages, vol. 6123, Springer, Berlin, Germany, accessed Feb. 28, 2024, https://link.springer.com/chapter/10.1007/978-3-642-13708-2_15.

IBM: List of IBM Patents or Patent Applications Treated as Related, Filed Mar. 13, 2024, 2 pages. (Appendix P).

Liu et al., "SecureBP from Homomorphic Encryption," Security and Communication Networks, Jun. 12, 2020, 9 pages, vol. 2020, hindawi.com, accessed Mar. 1, 2024, https://www.hindawi.com/journals/scn/2020/5328059/.

Lu et al., "PEGASUS: Bridging Polynomial and Non-polynomial Evaluations in Homomorphic Encryption," IEEE Symposium on Security and Privacy, 2021, pp. 1057-1073, IEEE, accessed Feb. 29, 2024, https://ieeexplore.ieee.org/stamp/stamp.jsp?arnumber=9519408.

Malik et al., "Coyote: A Compiler for Vectorizing Encrypted Arithmetic Circuits," ASPLOS 2023: Proceedings of the 28th ACM International Conference on Architectural Support for Programming Languages and Operating Systems, Mar. 2023, pp. 118-133, vol. 3, acm.org, accessed Feb. 28, 2024, https://dl.acm.org/ doi/10.1145/3582016.3582057.

Munro et al., "Optimal algorithms for parallel polynomial evaluation," 1Journal of Computer and System Sciences, 1973, pp. 189-198, vol. 7, Issue 2, accessed Feb. 29, 2024, https://www.sciencedirect.com/science/article/pii/S0022000073800431.

Okada et al., "Homomorphic Polynomial Evaluation Using Galois Structure and Applications to BFV Bootstrapping," Advances in Cryptology—ASIACRYPT 2023, 2023, pp. 1-32, vol. 14,443, Springer, Singapore, accessed Feb. 29, 2024, https://link.springer.com/chapter/10.1007/978-981-99-8736-8_3.

Pan, "Methods of Computing Values of Polynomials," Russian Mathematical Surveys, 1966, pp. 105-136, vol. 21, Issue 1, mathnet.ru, accessed Mar. 4, 2024, https://www.mathnet.ru/php/archive.phtml?wshow=paper&jrnid=rm&paperid=5823&option_lang=eng.

Park et al., "HE-Friendly Algorithm for Privacy Preserving SVM Training," IEEE Access, 2020, pp. 57,414-57,425, vol. 8, ieee.org, accessed Mar. 1, 2024, https://ieeexplore.ieee.org/document/9040596.

Paterson et al., "On the Number of Nonscalar Multiplications Necessary to Evaluate Polynomials," SIAM Journal on Computing, Mar. 1973, pp. 60-66, vol. 2, Issue 1, siam. org, accessed Mar. 4, 2024, https://epubs.siam.org/doi/022398abs/10.1137/0202007?journalCode=smjcat.

Smart et al., "Fully Homomorphic SIMD Operations," Designs, Codes, and Cryptography, Jul. 4, 2012, 19 pages, vol. 71, springer.com, accessed Feb. 29, 2024, https://link.springer.com/article/10.1007/s10623-012-9720-4.

Wang et al., "Efficient Homomorphic Integer Polynomial Evaluation Based on Gsw Fhe," The Computer Journal, Apr. 2018, pp. 575-585, vol. 61, No. 4, ieee.org, accessed Feb. 29, 2024, https://ieeexplore.ieee.org/document/8417171.

United States Notice of Allowance dated Dec. 11, 2025, 10 pages, in U.S. Appl. No. 18/242,067.

* cited by examiner

COMPUTING ENVIRONMENT
100

FIG. 1

COMPUTER    101

PROCESSOR SET    110

120 — PROCESSING CIRCUITRY          CACHE    —121

111 — COMMUNICATION FABRIC

112 — VOLATILE MEMORY

PERSISTENT STORAGE    113

122 — OPERATING SYSTEM          FULLY HOMOMORPHIC ENCRYPTION POLYNOMIAL EVALUATION SYSTEM    —180

PERIPHERAL DEVICE SET    114

123 — UI DEVICE SET    124 — STORAGE    IoT SENSOR SET    —125

NETWORK MODULE    115

103

END USER DEVICE

PRIVATE CLOUD

106

WAN    102

REMOTE SERVER

REMOTE DATABASE

130

104

GATEWAY    140

PUBLIC CLOUD    105

141 — CLOUD ORCHESTRATION MODULE          HOST PHYSICAL MACHINE SET    —142

143 — VIRTUAL MACHINE SET          CONTAINER SET    —144

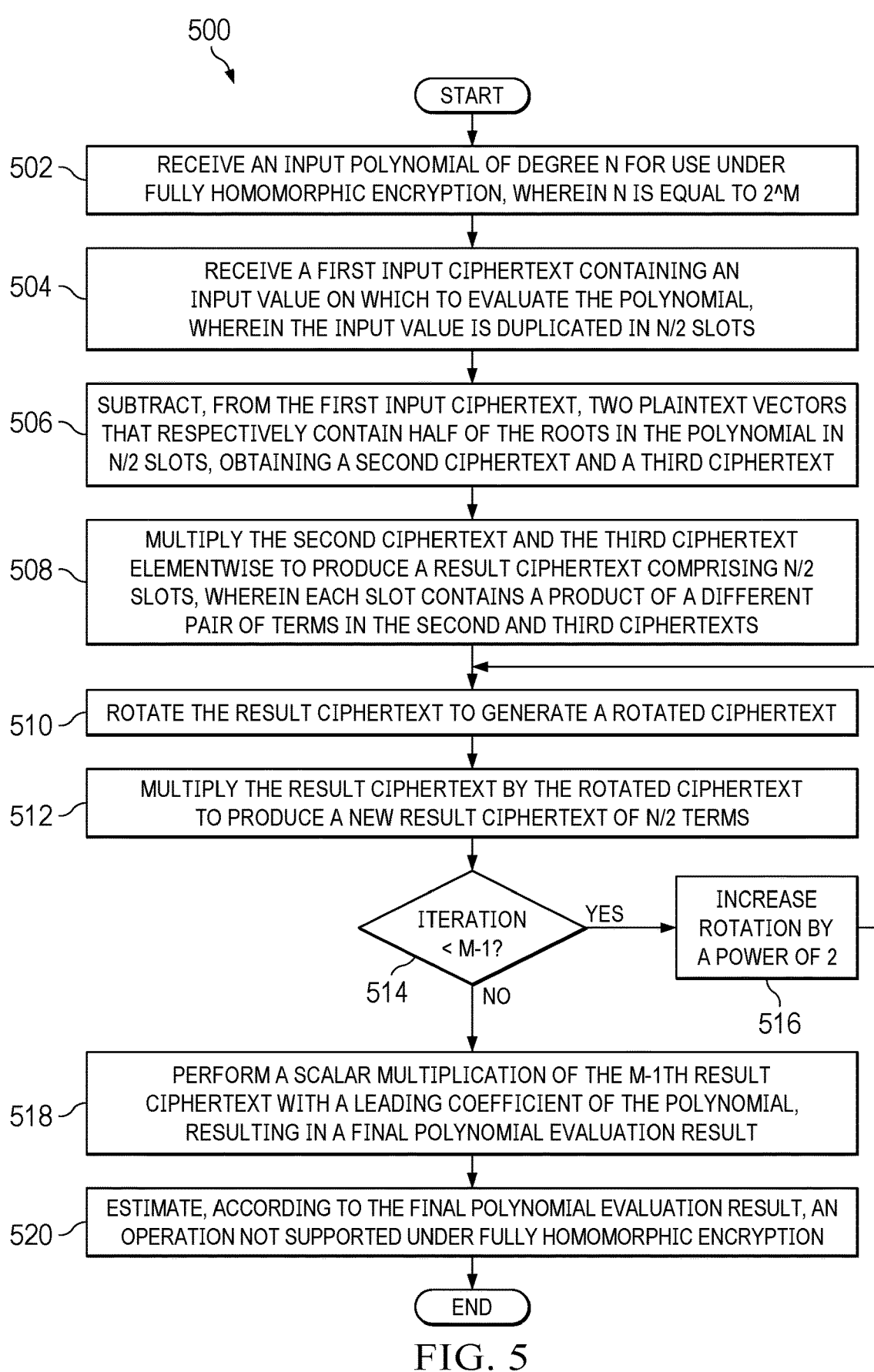

500

START

502 — RECEIVE AN INPUT POLYNOMIAL OF DEGREE N FOR USE UNDER FULLY HOMOMORPHIC ENCRYPTION, WHEREIN N IS EQUAL TO 2^M

504 — RECEIVE A FIRST INPUT CIPHERTEXT CONTAINING AN INPUT VALUE ON WHICH TO EVALUATE THE POLYNOMIAL, WHEREIN THE INPUT VALUE IS DUPLICATED IN N/2 SLOTS

506 — SUBTRACT, FROM THE FIRST INPUT CIPHERTEXT, TWO PLAINTEXT VECTORS THAT RESPECTIVELY CONTAIN HALF OF THE ROOTS IN THE POLYNOMIAL IN N/2 SLOTS, OBTAINING A SECOND CIPHERTEXT AND A THIRD CIPHERTEXT

508 — MULTIPLY THE SECOND CIPHERTEXT AND THE THIRD CIPHERTEXT ELEMENTWISE TO PRODUCE A RESULT CIPHERTEXT COMPRISING N/2 SLOTS, WHEREIN EACH SLOT CONTAINS A PRODUCT OF A DIFFERENT PAIR OF TERMS IN THE SECOND AND THIRD CIPHERTEXTS

510 — ROTATE THE RESULT CIPHERTEXT TO GENERATE A ROTATED CIPHERTEXT

512 — MULTIPLY THE RESULT CIPHERTEXT BY THE ROTATED CIPHERTEXT TO PRODUCE A NEW RESULT CIPHERTEXT OF N/2 TERMS

514 ITERATION < M-1?

YES → INCREASE ROTATION BY A POWER OF 2    516

NO

518 — PERFORM A SCALAR MULTIPLICATION OF THE M-1TH RESULT CIPHERTEXT WITH A LEADING COEFFICIENT OF THE POLYNOMIAL, RESULTING IN A FINAL POLYNOMIAL EVALUATION RESULT

520 — ESTIMATE, ACCORDING TO THE FINAL POLYNOMIAL EVALUATION RESULT, AN OPERATION NOT SUPPORTED UNDER FULLY HOMOMORPHIC ENCRYPTION

END

FIG. 5

FAST POLYNOMIAL EVALUATION UNDER FULLY HOMOMORPHIC ENCRYPTION BY PRODUCTS OF DIFFERENCES FROM ROOTS USING ROTATIONS

BACKGROUND

The disclosure relates generally to fully homomorphic encryption and more specifically to polynomial evaluation under fully homomorphic encryption.

Homomorphic encryption is a form of encryption in which computations can be performed on encrypted data without the need to first decrypt the data. The encrypted data is in the form of a ciphertext that contains the original plaintext data in a form that is unreadable by a human or computer with the proper cipher to decrypt it. The computations in homomorphic encryption are performed directly on the encrypted data (ciphertext), which results in encrypted results that match the results of the same computations performed on the original unencrypted plaintext data (with some error due to cryptographic error). Fully homomorphic encryption (FHE) allows for arbitrary computations on encrypted data, supporting addition, subtraction, and multiplication operations without limitations on the depth or complexity of the computations.

Homomorphic encryption allows user to evaluate any circuit (function) on encrypted data with the following four methods: Gen (generation), Enc (encryption), Dec (decryption), and Eval (evaluation). The client system uses Gen to generate a secret key (sk) and a paired public key (pk). The client system stores the secret key and publishes the public key. Subsequently, an untrusted entity can execute a function with the public key to evaluate a function on a ciphertext and store the results in another ciphertext. The client then uses Dec to decrypt the results ciphertext.

FHE enables computations to be outsourced to untrusted parties while still preserving privacy and confidentiality of the underlying data. Such outsourced computations might include secure cloud computing, machine learning, and multi-party computation.

A polynomial is a mathematical expression that includes variables and coefficients (constants) combined using addition, subtraction, multiplication, and positive integer exponents. Polynomials play a role in various mathematical areas and are used to model problems in science, engineering, and other fields. Polynomial evaluation refers to the process of calculating the value of a polynomial expression by substituting an input value for the variable.

Since the arithmetical operations of most FHE schemes only include addition, subtraction, and multiplication, polynomials are used to estimate other operations such as, e.g., division, square or cube roots, trigonometric function, and activation functions used in artificial neural networks, that are not typically supported under FHE. A ciphertext is substituted for the variable of the polynomial, and the indicated operation is then performed. Most existing evaluation algorithms attempt to optimize the number of operations needed. These operations include computing non-scalar products between ciphertexts, as happens when a variable x needed to be raised to higher powers (e.g., squared) as required by some term of a polynomial. Polynomial evaluation under FHE might also include computing scalar products, which are products between a ciphertext and a numeric plain real value, as happens when a variable x is multiplied by a known coefficient. Polynomial evaluation under FHE also includes additions.

In the present context, ciphertexts are assumed to encrypt vectors of values. The above mentioned FHE arithmetic operations are element-wise Single Instruction Multiple Data (SIMD) operations on these values. This assumption holds in many commonly used FHE schemes, such as CKKS (Cheon-Kim-Kim-Song). These FHE schemes usually support rotations operations on the encrypted vectors.

SUMMARY

According to an illustrative embodiment, a computer-implemented method for evaluating polynomials for use under fully homomorphic encryption is provided. The method comprises receiving an input polynomial of degree n for use under fully homomorphic encryption, wherein n is equal to $2^m$. The method also comprises receiving a first input ciphertext containing an input value on which to evaluate the polynomial, where the input value is duplicated in $n/2$ slots. Two plaintext vectors that respectively contain half of the roots in the polynomial in their $n/2$ slots are subtracted from the first input ciphertext, obtaining a second ciphertext and a third ciphertext. The second ciphertext and the third ciphertext are multiplied elementwise to produce a result ciphertext comprising $n/2$ slots, wherein each slot contains a product of a different pair of respective terms in the second and third ciphertexts. Iteratively, for a total of $m-1$ iterations, the result ciphertext is rotated by $2^i$ to generate a rotated ciphertext (wherein i is the iteration number) and multiplied by the rotated ciphertext to produce a new result ciphertext of $n/2$ terms. A scalar multiplication of the $m-1^{th}$ result ciphertext is performed with a leading coefficient of the polynomial, resulting in a final polynomial evaluation result that is duplicated in all slots of the final ciphertext, and an operation not supported under fully homomorphic encryption is estimated according to the final polynomial evaluation result. According to other illustrative embodiments, a computer system and a computer program product for evaluating polynomials for use under fully homomorphic encryption are provided.

BRIEF DESCRIPTION OF THE DRAWINGS

FIG. 1 is a block diagram of a computing environment in accordance with an illustrative embodiment;

FIG. 5 depicts a flowchart illustrating a process for evaluating polynomials for use under fully homomorphic encryption in accordance with an illustrative embodiment.

DETAILED DESCRIPTION

Figure 2A:
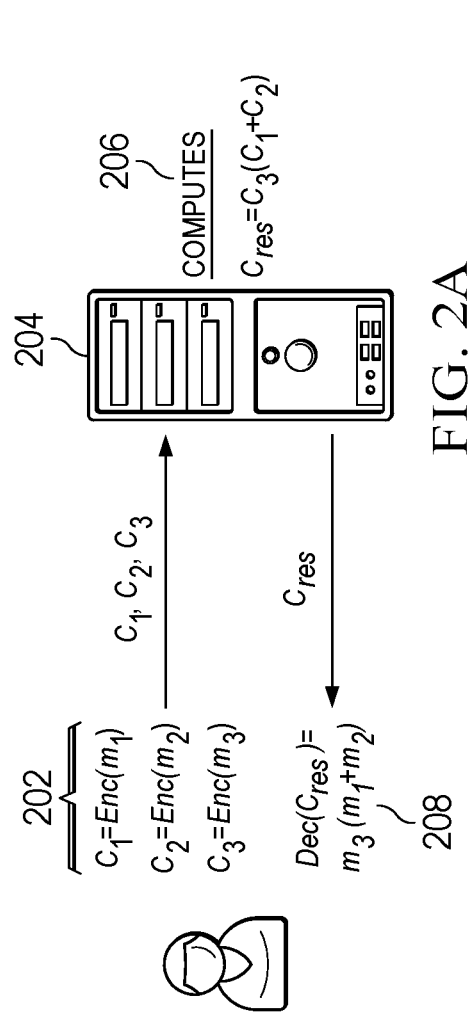
FIG. 2A depicts a diagram illustrating an example of arithmetic computation under homomorphic encryption to which the illustrative embodiments can be applied.

A computer-implemented method for evaluating polynomials for use under fully homomorphic encryption. The method comprises receiving an input polynomial of degree n for use under fully homomorphic encryption, wherein n is equal to $2^m$. The method also comprises receiving a first input ciphertext containing an input value on which to evaluate the polynomial, where the input value is duplicated in n/2 slots. Two plaintext vectors that respectively contain half of the roots in the polynomial in their n/2 slots are subtracted from the first input ciphertext, obtaining a second ciphertext and a third ciphertext. The second ciphertext and the third ciphertext are multiplied elementwise to produce a result ciphertext comprising n/2 slots, wherein each slot contains a product of a different pair of respective terms in the second and third ciphertexts. Iteratively, for a total of m−1 iterations, the result ciphertext is rotated by $2^i$ to generate a rotated ciphertext (wherein i is the iteration number) and multiplied by the rotated ciphertext to produce a new result ciphertext of n/2 terms. A scalar multiplication of the m−1$^{th}$ result ciphertext is performed with a leading coefficient of the polynomial, resulting in a final polynomial evaluation result that is duplicated in all slots of the final ciphertext, and an operation not supported under fully homomorphic encryption is estimated according to the final polynomial evaluation result. As a result, the illustrative embodiments provide a technical effect of enabling operations not otherwise possible under conditions of fully homomorphic encryption.

In the illustrative embodiments, the fully homomorphic encryption comprises the Cheon-Kim-Kim-Song scheme. Therefore, the illustrative embodiments provide the technical effect of supporting operations on complex and real numbers during polynomial evaluation.

In the illustrative embodiments, the first input ciphertext may be encrypted by a user and provided as an input. Therefore, the illustrative embodiments provide the technical effect of enabling the polynomial to be run directly on an input of a computation.

In the illustrative embodiments, the first input ciphertext may be generated by duplicating a value x within a circuit. Therefore, the illustrative embodiments provide the technical effect of taking advantage of chance duplication of the input in longer circuits.

In the illustrative embodiments, the first input ciphertext may be generated by a fourth ciphertext provided by a user containing a value x in the first slot of n/2 slots. For a total of m−1 iterations x is iteratively rotated one slot to the right of the fourth ciphertext to generate a fifth ciphertext which is added to the fourth ciphertext, with the rotation offset increasing by a factor of 2 each iteration. Therefore, the illustrative embodiments provide the technical effect of generating the input ciphertext directly.

As part of receiving the input ciphertext, when the input ciphertext contains a batch of up to 2S/n inputs, wherein S is the number of slots in a ciphertext, each input is duplicated n/2 times, filling up to all S slots of input ciphertext. Thereafter, all operations are repeated in single-instruction-multiple-data fashion for all input samples in parallel, producing up to 2S/n evaluation results. Therefore, the illustrative embodiments provide the technical effect of enabling a batch of up to 2S/n size to be computed at once in SIMD fashion.

For two polynomials of different degrees the illustrative embodiments order the polynomials into respective ciphertexts according to the degrees of the polynomials. When the ciphertext of the polynomial of higher degree has half of its slots free after i rotation and multiplication iterations, the ciphertext of the polynomial of smaller degree is merged into the ciphertext of the polynomial of higher degree to form a single merged ciphertext. The two ciphertexts are then computed in parallel using the single merged ciphertext. Therefore, the illustrative embodiments provide the technical effect of evaluating polynomials of different degrees in parallel using a single merged ciphertext.

A computer system comprises a storage device that stores program instructions and one or more processors operably connected to the storage device and configured to execute the program instructions to cause the system to receive an input polynomial of degree n for use under fully homomorphic encryption, wherein n is equal to $2^m$; receive a first input ciphertext containing an input value on which to evaluate the polynomial, wherein the input value is duplicated in n/2 slots; subtract, from first input ciphertext, two plaintext vectors that respectively contain half of the roots in the polynomial in n/2 slots, obtaining a second ciphertext and a third ciphertext; multiply the second ciphertext and the third ciphertext elementwise to produce a result ciphertext comprising n/2 slots, wherein each slot contains a product of a different pair of respective terms in the second and third ciphertexts; iteratively, for a total of m−1 iterations: rotate the result ciphertext by $2^i$ to generate a rotated ciphertext, wherein i is the iteration number and multiply the result ciphertext by the rotated ciphertext to produce a new result ciphertext of n/2 terms; perform a scalar multiplication of the m−1$^{th}$ result ciphertext with a leading coefficient of the polynomial, resulting in a final polynomial evaluation result; and estimate, according to the final polynomial evaluation result, an operation not supported under fully homomorphic encryption. As a result, the illustrative embodiments provide a technical effect of enabling operations not otherwise possible under conditions of fully homomorphic encryption.

In the illustrative embodiments, the fully homomorphic encryption comprises the Cheon-Kim-Kim-Song scheme. Therefore, the illustrative embodiments provide the technical effect of supporting operations on complex and real numbers during polynomial evaluation.

In the illustrative embodiments, the first input ciphertext may be encrypted by a user and provided as an input. Therefore, the illustrative embodiments provide the technical effect of enabling the polynomial to be run directly on an input of a computation.

In the illustrative embodiments, the first input ciphertext may be generated by duplicating a value x within a circuit. Therefore, the illustrative embodiments provide the technical effect of taking advantage of chance duplication of the input in longer circuits.

In the illustrative embodiments, the first input ciphertext may be generated by a fourth ciphertext provided by a user containing a value x in the first slot of n/2 slots. For a total of m−1 iterations x is iteratively rotated one slot to the right of the fourth ciphertext to generate a fifth ciphertext which is added to the fourth ciphertext, with the rotation offset increasing by a factor of 2 each iteration. Therefore, the illustrative embodiments provide the technical effect of generating the input ciphertext directly.

As part of receiving the input ciphertext, when the input ciphertext contains a batch of up to 2S/n inputs, wherein S is the number of slots in a ciphertext, each input is duplicated n/2 times, filling up to all S slots of input ciphertext. Thereafter, all operations are repeated in single-instruction-multiple-data fashion for all input samples in parallel, producing up to 2S/n evaluation results. Therefore, the illustrative embodiments provide the technical effect of enabling a batch of up to 2S/n size to be computed at once in SIMD fashion.

For two polynomials of different degrees the illustrative embodiments order the polynomials into respective ciphertexts according to the degrees of the polynomials. When the ciphertext of the polynomial of higher degree has half of its slots free after i rotation and multiplication iterations, the ciphertext of the polynomial of smaller degree is merged into the ciphertext of the polynomial of higher degree to form a single merged ciphertext. The two ciphertexts are then computed in parallel using the single merged ciphertext. Therefore, the illustrative embodiments provide the technical effect of evaluating polynomials of different degrees in parallel using a single merged ciphertext.

A computer program product performs evaluation of polynomials for use under fully homomorphic encryption. A persistent storage medium has program instructions configured to cause one or more processors to receive an input polynomial of degree n for use under fully homomorphic encryption, wherein n is equal to $2^m$; receive a first input ciphertext containing an input value on which to evaluate the polynomial, wherein the input value is duplicated in n/2 slots; subtract, from first input ciphertext, two plaintext vectors that respectively contain half of the roots in the polynomial in n/2 slots, obtaining a second ciphertext and a third ciphertext; multiply the second ciphertext and the third ciphertext elementwise to produce a result ciphertext comprising n/2 slots, wherein each slot contains a product of a different pair of respective terms in the second and third ciphertexts; iteratively, for a total of m−1 iterations: rotate the result ciphertext by $2^i$ to generate a rotated ciphertext, wherein i is the iteration number and multiply the result ciphertext by the rotated ciphertext to produce a new result ciphertext of n/2 terms; perform a scalar multiplication of the m−1$^{th}$ result ciphertext with a leading coefficient of the polynomial, resulting in a final polynomial evaluation result; and estimate, according to the final polynomial evaluation result, an operation not supported under fully homomorphic encryption.

In the illustrative embodiments, the fully homomorphic encryption comprises the Cheon-Kim-Kim-Song scheme. Therefore, the illustrative embodiments provide the technical effect of supporting operations on complex and real numbers during polynomial evaluation.

In the illustrative embodiments, the first input ciphertext may be encrypted by a user and provided as an input. Therefore, the illustrative embodiments provide the technical effect of enabling the polynomial to be run directly on an input of a computation.

In the illustrative embodiments, the first input ciphertext may be generated by duplicating a value x within a circuit. Therefore, the illustrative embodiments provide the technical effect of taking advantage of chance duplication of the input in longer circuits.

In the illustrative embodiments, the first input ciphertext may be generated by a fourth ciphertext provided by a user containing a value x in the first slot of n/2 slots. For a total of m−1 iterations x is iteratively rotated one slot to the right of the fourth ciphertext to generate a fifth ciphertext which is added to the fourth ciphertext, with the rotation offset increasing by a factor of 2 each iteration. Therefore, the illustrative embodiments provide the technical effect of generating the input ciphertext directly.

As part of receiving the input ciphertext, when the input ciphertext contains a batch of up to 2S/n inputs, wherein S is the number of slots in a ciphertext, each input is duplicated n/2 times, filling up to all S slots of input ciphertext. Thereafter, all operations are repeated in single-instruction-multiple-data fashion for all input samples in parallel, producing up to 2S/n evaluation results. Therefore, the illustrative embodiments provide the technical effect of enabling a batch of up to 2S/n size to be computed at once in SIMD fashion.

For two polynomials of different degrees the illustrative embodiments order the polynomials into respective ciphertexts according to the degrees of the polynomials. When the ciphertext of the polynomial of higher degree has half of its slots free after i rotation and multiplication iterations, the ciphertext of the polynomial of smaller degree is merged into the ciphertext of the polynomial of higher degree to form a single merged ciphertext. The two ciphertexts are then computed in parallel using the single merged ciphertext. Therefore, the illustrative embodiments provide the technical effect of evaluating polynomials of different degrees in parallel using a single merged ciphertext.

A computer-implemented method for evaluating polynomials for use under fully homomorphic encryption. The method comprises receiving an input polynomial of degree n for use under fully homomorphic encryption, wherein n<2S, where S is a power of 2, and wherein n=n1+n2 such that n1=ceil(n/2). A first ciphertext is generated comprising n1 terms and S−n1 slots set to 1. A second ciphertext is generated comprising n2 terms and S−n2 slots set to 1. A first plaintext vector is subtracted from the first ciphertext, wherein the first vector comprises n1 slots containing the first n1 roots of the polynomial followed by S−n1 zeros. A second plaintext vector is subtracted from the second ciphertext, wherein the second vector comprises n2 slots containing the remaining n2 roots of the polynomial followed by S−n2 zeros. After subtracting the first and second plaintext vectors, the first ciphertext and the second ciphertext are multiplied elementwise to produce a result ciphertext comprising n1 slots, wherein each slot contains a product of a different pair of respective terms in the first and second ciphertexts. Iteratively, for a total of log $2(n)$−1 iterations, the result ciphertext are rotated by $2^i$ to generate a rotated ciphertext, wherein i is the iteration number, and multiplied by the rotated ciphertext to produce a new result ciphertext of n1 terms. A scalar multiplication of the log $2(n)$−1$^{th}$ result ciphertext with a leading coefficient of the polynomial is performed, resulting in a final polynomial evaluation result. An operation not supported under fully homomorphic encryption is estimated according to the final polynomial evaluation result. As a result, the illustrative embodiments provide a technical effect of enabling operations not otherwise possible under conditions of fully homomorphic encryption.

In the illustrative embodiments, the fully homomorphic encryption comprises the Cheon-Kim-Kim-Song scheme. Therefore, the illustrative embodiments provide the technical effect of supporting operations on complex and real numbers during polynomial evaluation.

A computer-implemented method for evaluating polynomials for use under fully homomorphic encryption. The method comprises receiving an input polynomial of degree n for use under fully homomorphic encryption, wherein the polynomial has n roots, and wherein n is equal to a power, m, of 2. A first ciphertext is received containing an input value on which to evaluate the polynomial, where the input value is duplicated in n/2 slots. Two plaintext vectors are subtracted that respectively contain half of the roots in the polynomial in n/2 slots each are subtracted from the first ciphertext, obtaining a second and third ciphertexts. The second ciphertext and the third ciphertext are multiplied elementwise to produce a result ciphertext comprising n/2 slots, wherein each slot contains a product of a different pair of respective terms in the second and third ciphertexts. The result ciphertext is iteratively multiplied by a rotated version of itself for m−1 iterations, wherein rotation increases by a power of 2 each iteration. A final result ciphertext is multiplied by a leading coefficient of the polynomial, wherein the final result ciphertext encrypts the product of all differences of the input from the n roots of the polynomial, resulting in a final polynomial evaluation result that is duplicated in all slots of the final result ciphertext. An operation not supported under fully homomorphic encryption is estimated according to the final polynomial evaluation result. As a result, the illustrative embodiments provide a technical effect of enabling operations not otherwise possible under conditions of fully homomorphic encryption.

In the illustrative embodiments, the fully homomorphic encryption comprises the Cheon-Kim-Kim-Song scheme. Therefore, the illustrative embodiments provide the technical effect of supporting operations on complex and real numbers during polynomial evaluation.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as Fully Homomorphic Encryption (FHE) polynomial evaluation system 180.

In addition to FHE polynomial evaluation system 180, computing environment 100 includes, for example, computer 101, wide area network (WAN) 102; end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and FHE polynomial evaluation system 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in FHE polynomial evaluation system 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in FHE polynomial evaluation system 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to a "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account a number of different considerations as described herein. For example, the illustrative embodiments recognize and take into account that the CKKS (Cheon-Kim-Kim-Song) FHE scheme supports operations on complex and real numbers and is therefore particularly suitable for polynomial evaluation over real coefficients and variables.

The illustrative embodiments also recognize and take into account that in CKKS and other FHE schemes, non-scalar products are more time consuming to calculate than scalar products and additions. Therefore, non-scalar products are one of the main targets of optimization for polynomial evaluation algorithms used by FHE.

The illustrative embodiments also recognize and take into account that another important target of FHE optimization is the depth of the product, since deep products imply the need for costly bootstrap operations. Another target of optimization is the numeric stability of the evaluation process, since numeric stability and homomorphic errors can accumulate and mask the result.

The illustrative embodiments also recognize and take into account that the Paterson-Stockmeyer algorithm produces the optimal number of non-scalar products and depth, namely $\sqrt{2n}+\log 2(n)$ non-scalar products, $n-\sqrt{n/2}$ scalar products, and a product depth of $\text{ceil}(\log(n))$ for an n-degree polynomial.

The illustrative embodiments provide a method of evaluating polynomials under FHE by generating two ciphertexts C01 and C02 from an n-degree polynomial P(x), each ciphertext duplicating x in n/2 slots. By subtracting from these ciphertexts two plaintexts containing the n roots of the polynomial each of the ciphertexts contains n/2 terms. The ciphertexts C01 and C02 are multiplied elementwise to produce a new ciphertext C1 with n/2 slots, each containing a product of a different pair of terms. C1 is then rotated by 1 and multiplied by the original version of C1 to produce ciphertext C2. Ciphertext C2 is rotated by 2 and multiplied by the original version of C2, etc., until after m−1=log 2(n/2) rotation-and-multiplication steps, wherein the resulting ciphertext Cm encrypts the product of all n differences of x from the different n roots of the polynomial, and this product is duplicated in all n/2 slots of Cm. Cm is then multiplied by the coefficient c of the polynomial to get the value of P(x).

The method of the illustrative embodiments involves m=log 2(n) non-scalar products, m−1=log 2(n/2) rotations, and one scalar product. The product depth is m+1=log 2(n)+1. For a value of n that is not a power of 2, if n<2S where S is the number of ciphertext slots, the depth is ceil (log 2(n)). Even with the added rotations, the order of the number of operations is logarithmic in n rather than sqrt (2n)+log(n) as in the Paterson-Stockmeyer algorithm.

Figure 2B:
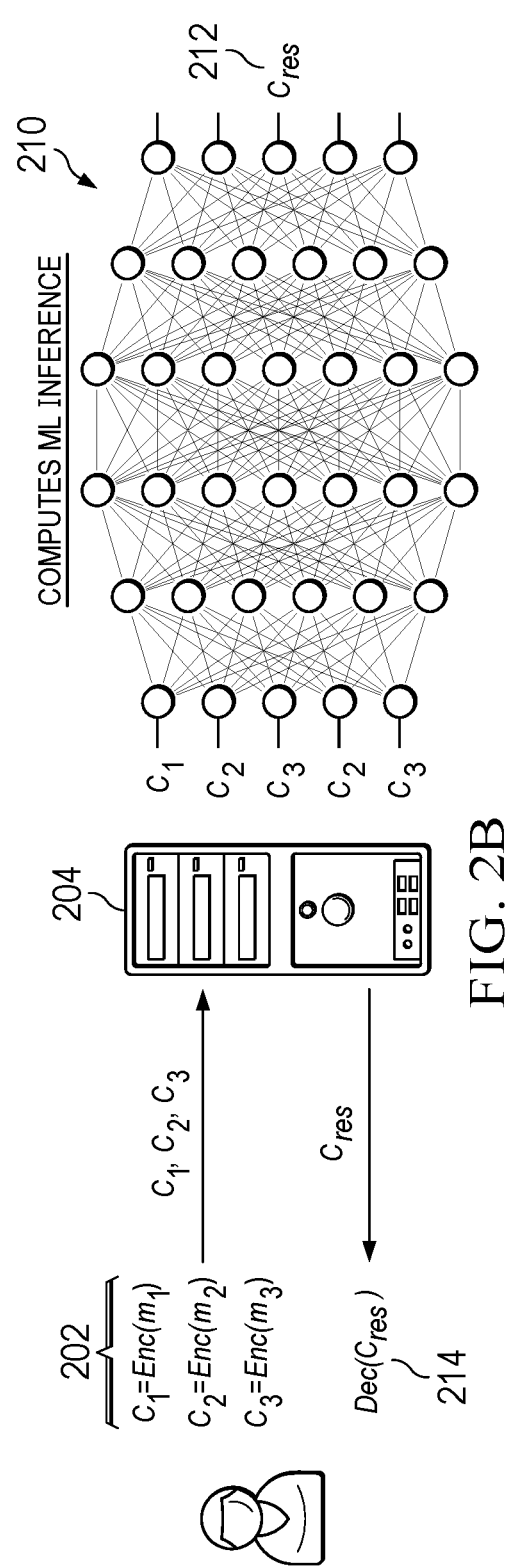
FIG. 2B depicts a diagram illustrating an example of machine learning under homomorphic encryption to which the illustrative embodiments can be applied.

FIG. 2A depicts a diagram illustrating an example of arithmetic computation under homomorphic encryption to which the illustrative embodiments can be applied. FIG. 2B depicts a diagram illustrating an example of machine learning under homomorphic encryption to which the illustrative embodiments can be applied.

In both examples, a user encrypts data $m_1$, $m_2$, $m_3$ into ciphertexts $C_1$, $C_2$, $C_3$ 202 and then sends the ciphertexts 202 to an untrusted third party such as a cloud system 204 for computation. The examples differ with regard to the nature of the computation performed by the cloud system 204. In FIG. 2A, cloud system 204 performs an arithmetic operation with the encrypted ciphertexts 202 to generate an encrypted result $C_{res}$ 206, which is returned to the user. The user can then decrypt the encrypted result 206 to obtain decrypted results $Dec(C_{res})$ 208 which is equivalent to the result that would have been obtained by performing the same arithmetic operation on the original unencrypted data $m_1$, $m_2$, $m_3$.

The example shown in FIG. 2B differs in the type of computation performed on the ciphertexts $C_1$, $C_2$, $C_3$ 202. In this example, the ciphertexts 202 are fed into the input layer of an artificial neural network 210, which generates a machine learning inference in the form of encrypted result 212 that is returned to the user for decryption to obtain decrypted result $Dec(C_{res})$ 214. Again, the encrypted result 212 generated by neural network 210 is the same as a machine learning inference generated from the original unencrypted data $m_1$, $m_2$, $m_3$.

In the context of homomorphic encryption, ciphertext packing is used to process multiple ciphertexts simultaneously. Ciphertext packing comprises aggregating multiple ciphertexts into a single structure, which can reduce overhead and improve computational efficiency. Single Instruction Multiple Data (SIMD) is a common ciphertext packing approach in which multiple ciphertexts are packed into vectors or arrays allowing computations to be performed in parallel on multiple ciphertexts with a single instruction.

A ciphertext of CKKS (as in other popular FHE schemes) encrypts a vector of real values, wherein the entries of the vectors are termed "slots." In any CKKS configuration all the ciphertexts have the same chosen number of slots, which is always a power of 2, e.g., 2^15 or 2^16 slots. The arithmetic operations of FHE (addition, subtraction, multiplication) operate in SIMD fashion, i.e., elementwise on the corresponding ciphertexts. Therefore, when multiplying, for example, two ciphertexts A and B with 2^16 slots each, the result is a ciphertext C of 2^16 slots containing the products of the corresponding 2^16 pairs of slots from A and B.

Figures 3, 4:
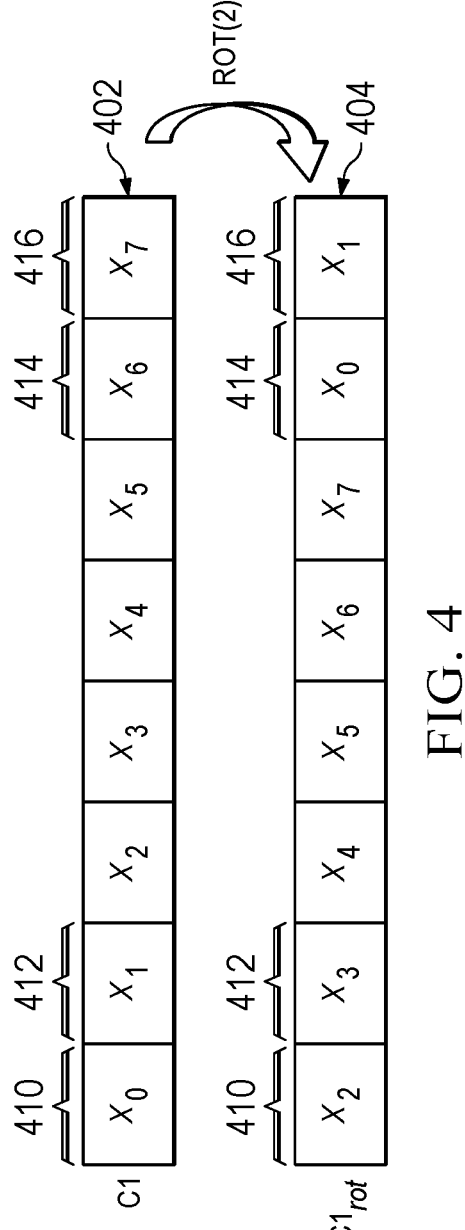
FIG. 3 depicts a diagram illustrating an example of SIMD packing which can be applied in the illustrative embodiments.
FIG. 4 depicts a diagram illustrating rotation of a ciphertext with which the illustrative embodiments can be implemented.

FIG. 3 depicts a diagram illustrating an example of SIMD packing which can be applied in the illustrative embodiments. In this simple example, two ciphertexts, Ciphertext 1 302 and Ciphertext 2 304 each comprise eight slots (2^3). By performing elementwise multiplication between Ciphertext 1 302 and Ciphertext 2 304, it is possible to pack the elements of both ciphertexts into a single vector, Ciphertext 3 306. The resultant Ciphertext 3 306 also comprises eight slots. Each slot position in Ciphertext 3 306 contains the elementwise product of the respective elements in the corresponding slot position of both factor ciphertexts 302, 304. Therefore, in the present example, the first (left most) slot in Ciphertext 3 306 contains the elementwise product $x_0 w_0$ of the element $x_0$ in the first slot of Ciphertext 1 302 and the element $w_0$ in the first slot of Ciphertext 2 304. Similarly, the second slot in Ciphertext 3 306 contains the elementwise product $x_1 w_1$ of the element $x_1$ in the second slot of Ciphertext 1 302 and the element $w_1$ in the second slot of Ciphertext 2 304, etc., down the line for all slots.

FIG. 4 depicts a diagram illustrating rotation of a ciphertext with which the illustrative embodiments can be implemented. FHE supports rotate operations on a ciphertext in which the contents of slots are rotated a specified number to produce a ciphertext that has the same number of slots but with the contents in different slot positions than the original ciphertext vector. For a ciphertext C and integer n, the rotation (C, n) returns a ciphertext that encrypts the same vector of slots as C, but the contents of all the slots are now rotated n slots to the left. In Current implementations of CKKS a rotate operation works fastest when n is a power of 2, and the time for a single rotation is comparable to the time of a single multiply operation and much faster (×10) when running on GPUs.

In the example shown in FIG. 4, ciphertext C1 402 undergoes a rotate operation Rot(2) which rotates the content of all slots to the left by 2. Therefore, the contents x0, x1 of the first two slots 410, 412, respectively, are moved to the last two slots 414, 416, and the contents are moved two slots to the left, resulting in ciphertext $C1_{rot}$ 404.

The illustrative embodiments utilize SIMD ciphertext packing and rotation to evaluate polynomials. By the Fundamental Theorem of algebra, a polynomial P of degree n with real or complex coefficients has n complex roots r1, r2, . . . , rn, including multiplicity (i.e., some roots might be repeated). Thus, polynomial P(x) can be represented with the n complex roots and a real coefficient c as follows:

$$P(x) = c*(x-r1)*(x-r2)* \ldots *(x-rn)$$

where x is the value on which the polynomial is evaluated. It may either be the encrypted input obtained from a user or the mid-result of some computation that was applied on the original input.

Let M be the smallest power of 2 that is not smaller than n (i.e., ceiling value of the base 2 logarithm of n), so M=2^m, where m=ceil(log 2(n)).

The method of the illustrative embodiments generates two ciphertexts C01, C02 from the above polynomial P(x), with each root encrypted in a respective slot in the ciphertexts.

C01 comprises x duplicated n1 times

C02 comprises x duplicated n2 times where n1+n2=n (the degree of polynomial P(x)).

Let n1=M/2 and n2=M/2−(M−n). If n<M, the next (M−n) slots of C02 are set to 1 (e.g., with appropriate masking and addition).

The ciphertexts C01 and C02 can be created in a number of manners. If P(x) is to be run directly on an input of a computation, the user can encrypt ciphertexts C01 and C02 and send them as inputs. Inside a longer circuit, there may be access to a duplicated version of x. Such chance duplications can be used even if they have more than n1/n2 duplications of x. One can also create C01 and C02 directly given a ciphertext, where x is encoded in the first slot and the other slots are 0, rotating 1 to the right then adding the first ciphertext to the resultant rotated ciphertext, then rotating 2 to the right and adding again, etc., until enough duplications of x have been computed to fill the slots. If x appears in some other slot, or if the remaining slots are non-0, this can be corrected by an appropriate rotation and product with a mask.

For the illustrative example, assume $n=2^m$, wherein each ciphertext encrypts half the roots of the polynomial. The ciphertexts generated from the polynomial $P(x)$ are:

$$C01: [x - r_1, x - r_2, x - r_3, \ldots, x - r_{n/2}]$$
$$C02: \left[x - r_{\frac{n}{2}+1}, x - r_{\frac{n}{2}+2}, x - r_{\frac{n}{2}+3}, \ldots, x - r_n\right]$$

C01 and C02 are then multiplied to produce a non-scalar product, ciphertext C1:

$$C1: \left[(x - r_1)\left(x - r_{\frac{n}{2}+1}\right), (x - r_2)\left(x - r_{\frac{n}{2}+2}\right), (x - r_3)\left(x - r_{\frac{n}{2}+3}\right), \ldots, \left(x - r_{\frac{n}{2}}\right)(x - r_n)\right]$$

Starting with C1, the ciphertext is rotated, and the rotated ciphertext is multiplied by the original (unrotated) ciphertext. This process is continued iteratively through m. For i=2 to m, the rotation is:

$$C_i = C_{i-1} * \text{rotate}\left(C_{i-1}, 2^{i-1}\right) \qquad \text{Eq. 1}$$

Therefore, C1 (i=2) is rotated 2, resulting in rotated ciphertext $C1_{rot}$:

$$C1_{rot}: \left[(x - r_3)\left(x - r_{\frac{n}{2}+3}\right), \ldots, \left(x - r_{\frac{n}{2}}\right)(x - r_n), (x - r_1)\left(x - r_{\frac{n}{2}+1}\right), (x - r_2)\left(x - r_{\frac{n}{2}+2}\right)\right]$$

Ciphertext C1 is multiplied by $C1_{rot}$ to produce new ciphertext C2.

According to Eq. 1, C2 (i=3) is rotated 4, generating $C2_{rot}$, which is multiplied by C2 to product ciphertext C3. C3 is rotated 8 to generated $C3_{rot}$ which is multiplied by C3 to produce ciphertext C4, etc. This rotate-and-multiply process is iterated through i=m, with the rotation increasing by a power of 2 each iteration.

The final ciphertext Cm is then multiplied by the coefficient c of polynomial $P(x)$ to produce a scalar product. As a result, the entire polynomial $P(x)$ is encrypted in the first slot of Cm.

The present method therefore comprises m=ceil(log 2(n)) non-scalar products and m−1=ceil(log 2(n))−1 rotations. If x is manually duplicated, at most ceil(log 2(n1))+ceil(log 2(n2)) rotations are added, or just ceil(log 2(n1)) if n1=n2.

When n is not a power of 2, one scalar product is used for masking in generating C01 and C02. This scalar product can be avoided if x is duplicated exactly n2 times for C02 using known methods.

There is one scalar product with coefficient c when n is a power of 2, as in the above example. When n is not a power of 2, this scalar product can be avoided by setting one of the extra slots of C02 to c instead of to 1.

In the typical case where rotations are more or less as fast as products (or much faster in the case of GPUs), the present generates almost exponentially faster results than the best result of sqrt(2n)+log 2(n) non-scalar products of the Paterson-Stockmeyer algorithm. In the Paterson-Stockmeyer algorithm, where the n terms are multiplied via a binary tree of products of depth log(n), about half of the products are done in the top-most chain-index, which is the slowest. A fourth of the products are done in the next chain-index, an eighth in the next chain-index, etc., until the final product in the root is done in the lowest and fastest chain-index of the computation. In contrast, in the method of the illustrative embodiments, each of the log 2(n) products is done in the next chain-index, and therefore this is just one product at each level.

The product depth is log 2(n) as in other methods but computation depth is 2 log 2(n) because of rotations. This increased computation depth may increase noise, but tests showed that this added noise is negligible.

The method of the illustrative embodiments relies on knowing the n complex roots of the given polynomial, which can be performed offline and not under FHE. For some specific, useful high-degree polynomials (e.g., Goldschmidt polynomials estimating 1/x), it is easy to find the roots.

The method of the illustrative embodiments takes up to n/2 slots to compute a polynomial of degree n. Therefore, assuming ciphertexts with S slots, the maximal batch that can be computed at once in SIMD using the present method is 2S/n. If one needs to compute the polynomial on a whole batch of S slots the present method performance counts rise by n/2 times to (n/2)ceil(log 2(n)) products and (n/2)ceil(log 2(n)) rotations. If the batch size times n/2 is less than S (i.e., the entire batch fits inside a single ciphertext), the original low counts of products and rotations still hold.

When considering a batch of size larger than 2S/n, the data do not fit within one ciphertext. In this case the data can be packed into multiple ciphertexts in a tile tensor. There are two options of proceeding. The first option considers multiple instances of sub-batches, wherein each sub-batch is in a separate ciphertext, each less than 2S/n in size. The above process is then used for every sub-batch (per ciphertext). The second option extends the above process to support multiple ciphertexts. In this second option, the algorithm splits the batch into sub-batches. After the $i^{th}$ iterations rotate-and-multiply, $n/2^i$ slots are used per input and $(n/2 - n/2^i)$ slots are "waste" slots or free slots that are not yet 0 (i.e., for 2S/n inputs in a ciphertext, after the $i^{th}$ iterations there are at least $2S/n*(n/2 - n/2^i)=(S - S/2^{(-i-1)})$ waste slots. When $(S - S/2^{(i-1)}) > S/2$, more than half the slots are free, and the two ciphertexts can be merged together (i.e., combining two sub-batches) and continues with computation over one ciphertext only. In practice, the merge happens after every iteration.

For example, if the polynomial is of degree 16, and log 2(16)=4 multiplications are required, then for eight ciphertexts, 8*4=32 multiplications and 32 rotations are required. Using the extended algorithm, after the first iteration and a merge, there will be four ciphertexts, and after the second iteration there will be only two ciphertexts. Therefore, the total number of multiplications is 8+4+2+1=15 in addition to 15 multiplications by plaintext masks and 15 rotations.

When dealing with two polynomials of different degrees the illustrative embodiments use the above merge method to leverage the free slots of ciphertexts. For example, for the polynomials:

$$p1(x) = 4x^{16} + x^2 + x$$

$$p2(x) = 3x^8 + x$$

p1(x) requires 4 multiplications, while p2(x) requires 3 multiplications. However, after performing the first iteration for computing p1, half the slots are left unused. Therefore, p2(x) can be plugged into these unused slots, and p1 and p2 can be computed in parallel using only in ciphertext. Assignment of polynomials within ciphertexts is done using the extended algorithm above and by ordering the polynomials according to their degree.

FIG. 5 depicts a flowchart illustrating a process for evaluating polynomials for use under fully homomorphic encryption in accordance with an illustrative embodiment. Process 500 can be implemented in FHE polynomial evaluation system 180 in FIG. 1.

Process 500 begins by receiving an input polynomial of degree n for use under fully homomorphic encryption, wherein n is equal to $2^m$ (step 502). In this method, n equals twice the number of slots in the ciphertext vectors. Therefore, every ciphertext includes $n/2=2^{(m-1)}$ slots. Process 500 receives a first input ciphertext containing an input value on which to evaluate the polynomial, wherein the input value is duplicated in n/2 slots (step 504). The first input ciphertext can be encrypted by a user and provided as an input. Alternatively, the first input ciphertext can be generated by duplicating a value x within a circuit. The first input ciphertext can also be generated by a ciphertext provided by a user containing a value x in the first slot of n/2 slots. Iteratively, for a total of m−1 iterations, x is rotated one slot to the right of the ciphertext to generate a second ciphertext and adding the first ciphertext to the second ciphertext, with the rotation offset increasing by a factor of 2 each iteration.

Two plaintext vectors that respectively contain half of the roots in the polynomial in their n/2 slots are subtracted from the first input ciphertext to obtain a second ciphertext and a third ciphertext (step 506). The second ciphertext and third ciphertext respectively encrypt half of the differences of the input value from the roots of the polynomial in n/2 slots.

Process 500 multiplies the second ciphertext and the third ciphertext elementwise to produce a result ciphertext comprising n/2 slots, wherein each slot contains a product of a different pair of terms in the second and third ciphertexts (step 508).

The result ciphertext is rotated by $2^i$ to generate a rotated ciphertext, wherein i is the iteration number (step 510), and the result ciphertext is multiplied by the rotated ciphertext to produce a new result ciphertext of n/2 terms (step 512).

Process 500 determines if the number of iterations has reached m−1 (step 514). If the iteration count, i, is less than m−1, the rotation is increased by a power of 2 (step 516), and the rotation and multiplication and steps 510 and 512 are repeated until m−1 iterations have been performed. The final $(m-1^{th})$ non-scalar result ciphertext encrypts the product of all differences of the input x from the n roots of the polynomial.

After m−1 iterations, process 500 performs a scalar multiplication of the final $m-1^{th}$ non-scalar product ciphertext with a leading coefficient of the polynomial, resulting in a final polynomial evaluation result that is duplicated in all slots of the final result ciphertext (step 518).

Process 500 then estimates, according to the final polynomial evaluation result, an operation not supported under fully homomorphic encryption (step 520). Process 500 then ends.

The method described above covers the case where the degree n of the polynomial equals 2S where S is the number of slots (i.e., vector entries) in each ciphertext. However, this method of the illustrative embodiments can be generalized to work when n<2S (i.e., n is not a power of 2).

In the situation when n<2S, there are 2S-n unused slots in the initial two ciphertexts C01, C02 generated from the polynomial. (Generalizing this rule to the case where n=2S, the number of unused slots in C01 and C02 is 2S−n=2S−2S=0, which is why there are no unused slots in C01 and C02 when n is a power of 2.)

The unused slots are each filled with 1 such that the product of all 2S slots still equals the product of the n used slots in the two ciphertexts C01, C02 that contain the n terms of X differences from the n roots of the polynomial (i.e., $x-r_i$).

Stated more formally, assuming a polynomial P(x) as above but where n<2S, then n=n1+n2 such that n1=ceil(n/2). As above, two ciphertexts are generated from P(x), wherein:

C01 comprises x duplicated n1 times. The remaining S−n1 slots are set to 1.

C02 comprises x duplicated n2 times. The remaining S−n2 slots are set to 1.

The expression n1=ceil(n/2) means that the n terms are divided approximately evenly between C01 and C02, each having ~n/2 terms and 1s in the unused slots. These terms are multiplied after subtracting the corresponding roots.

Using a single SIMD subtract operation, a vector comprising the first n1 slots containing the first n1 roots of the polynomial followed by S−n1 zeros is subtracted from ciphertext C01. The result of this subtraction is the first n1 terms that need to be multiplied, followed by 1s. A similar subtraction is performed for C02 with the remaining n2 roots of the polynomial.

After the subtractions, the method proceeds as in the case of n=2S. C01 and C02 are multiplied to produce a vector with n1 (~n/2) slots that include elementwise products of the pairs of terms and S−n1 slots with 1s. This vector then undergoes rotation and multiplication. This method will reach the product of all n/2 products of pairs after ~log(n/2) rotations, which is less than log 2(S) steps (again, assuming n<2S).

Figure 6:
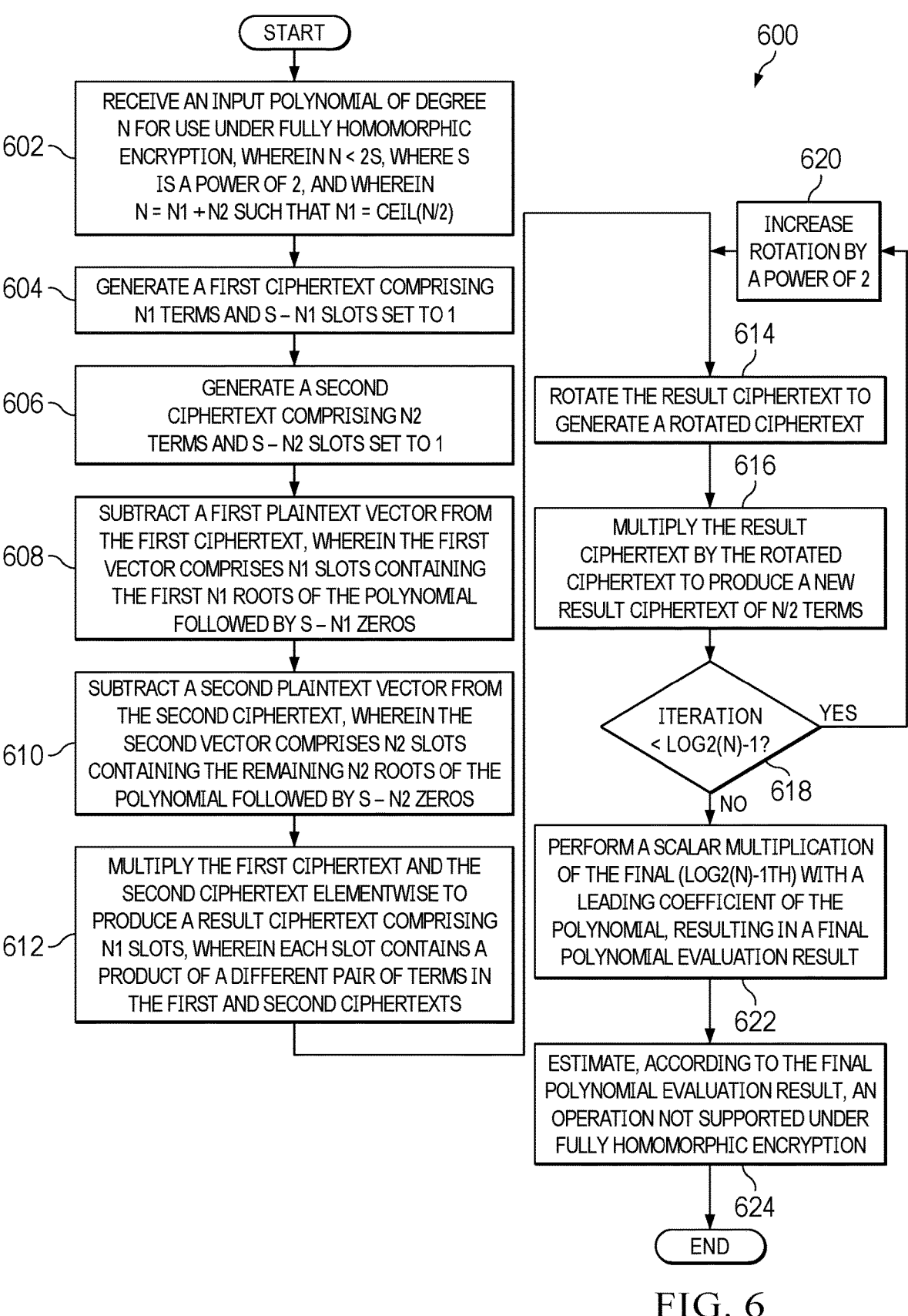
FIG. 6 depicts a flowchart illustrating a process for evaluating polynomials for use under fully homomorphic encryption, wherein the polynomials are of a degree that is not a power of 2, in accordance with an illustrative embodiment.

FIG. 6 depicts a flowchart illustrating a process for evaluating polynomials for use under fully homomorphic encryption, wherein the polynomials are of a degree that is not a power of 2, in accordance with an illustrative embodiment. Process 600 can be implemented in FHE polynomial evaluation system 180 in FIG. 1.

Process 600 begins by receiving an input polynomial of degree n for use under fully homomorphic encryption, wherein n<2S, where S is a power of 2, and wherein n=n1+n2 such that n1=ceil(n/2) (step 602). Process 600 then generates a first ciphertext comprising n1 terms and S−n1 slots set to 1 (step 604) and a second ciphertext comprising n2 terms and S−n2 slots set to 1 (step 606).

Process 600 subtracts a first plaintext vector from the first ciphertext, wherein the first vector comprises n1 slots containing the first n1 roots of the polynomial followed by S−n1 zeros (step 608). Process also subtracts a second plaintext vector from the second ciphertext, wherein the second vector comprises n2 slots containing the remaining n2 roots of the polynomial followed by S−n2 zeros (step 610).

After subtracting the first and second plaintext vectors, process 600 multiplies the first ciphertext and the second ciphertext elementwise to produce a result ciphertext comprising n1 slots, wherein each slot contains a product of a different pair of respective terms in the first and second ciphertexts (step 612).

The result ciphertext is rotated by $2^i$ to generate a rotated ciphertext, wherein i is the iteration number (step 614), and the result ciphertext is multiplied by the rotated ciphertext to produce a new result ciphertext of n/2 terms (step 616).

Process 600 determines if the number of iterations has reached log 2(n)−1 (step 618). If the iterations are less than log 2(n)−1, the rotation is increased by a power of 2 (step 620) and repeats the rotation and multiplication and steps 614 and 616 until log 2 (n)−1 iterations have been performed. The log $2(n)-1^{th}$ result ciphertext encrypts the product of all differences of the input x from the n roots of the polynomial.

After log 2(n)−1 iterations, process 600 performs a scalar multiplication of the log $2(n)-1^{th}$ result ciphertext with a leading coefficient of the polynomial, resulting in a final polynomial evaluation result that is duplicated in all slots of the final result ciphertext (step 622).

Process 600 then estimates, according to the final polynomial evaluation result, an operation not supported under fully homomorphic encryption (step 624). Process 600 then ends.

As used herein, "a number of" when used with reference to items, means one or more items. For example, "a number of parameters" is one or more parameters. As another example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of evaluating polynomials for use under fully homomorphic encryption, the method comprising:

using a number of processors to perform:

receiving an input polynomial of degree n for use under fully homomorphic encryption, wherein n is equal to $2^m$;

receiving a first input ciphertext containing an input value on which to evaluate the polynomial, wherein the input value is duplicated in n/2 slots;

subtracting, from the first input ciphertext, two plaintext vectors that respectively contain half of the roots in the polynomial in n/2 slots, obtaining a second ciphertext and a third ciphertext;

multiplying the second ciphertext and the third ciphertext elementwise to produce a result ciphertext comprising n/2 slots, wherein each slot contains a product of a different pair of respective terms in the second and third ciphertexts;

iteratively, for a total of m−1 iterations:

rotating the result ciphertext by $2^i$ to generate a rotated ciphertext, wherein i is the iteration number;

multiplying the result ciphertext by the rotated ciphertext to produce a new result ciphertext of n/2 terms;

performing a scalar multiplication of the $m-1^{th}$ result ciphertext with a leading coefficient of the polynomial, resulting in a final polynomial evaluation result; and estimating, according to the final polynomial evaluation result, an operation not supported under fully homomorphic encryption.

2. The method of claim 1, wherein the fully homomorphic encryption comprises the Cheon-Kim-Kim-Song scheme.

3. The method of claim 1, wherein the first input ciphertext is encrypted by a user and provided as an input.

4. The method of claim 1, wherein the first input ciphertext is generated by duplicating a value x within a circuit.

5. The method of claim 1, wherein the first input ciphertext is generated by:

a fourth ciphertext provided by a user containing a value x in the first slot of n/2 slots;

iteratively, for a total of m−1 iterations:

rotating x one slot to the right of the fourth ciphertext to generate a fifth ciphertext; and adding the fourth ciphertext to the fifth ciphertext, with the rotation offset increases by a factor of 2 each iteration.

6. The method of claim 1, wherein, when the first input ciphertext contains a batch of up to 2S/n inputs, wherein S is the number of slots in a ciphertext:

duplicating each input n/2 times, filling up to all S slots of input ciphretext; and proceeding with the steps of claim 1, wherein all operations are carried out in single-instruction-multiple-data fashion for all input samples in parallel, producing up to 2S/n evaluation results.

7. The method of claim 1, wherein, for two polynomials of different degrees:

ordering the polynomials into respective ciphertexts according to the degrees of the polynomials;

when the ciphertext of the polynomial of higher degree has half of its slots free after i rotation and multiplication iterations, merging the ciphertext of the polynomial of smaller degree into the ciphertext of the polynomial of higher degree to form a single merged ciphertext; and computing the two ciphertexts in parallel using the single merged ciphertext.

8. A system for evaluating polynomials for use under fully homomorphic encryption, the system comprising:

a storage device that stores program instructions;

one or more processors operably connected to the storage device and configured to execute the program instructions to cause the system to:

receive an input polynomial of degree n for use under fully homomorphic encryption, wherein n is equal to $2^m$;

receive a first input ciphertext containing an input value on which to evaluate the polynomial, wherein the input value is duplicated in n/2 slots;

subtract, from first input ciphertext, two plaintext vectors that respectively contain half of the roots in the polynomial in n/2 slots, obtaining a second ciphertext and a third ciphertext;

multiply the second ciphertext and the third ciphertext elementwise to produce a result ciphertext comprising n/2 slots, wherein each slot contains a product of a different pair of respective terms in the second and third ciphertexts;

iteratively, for a total of m−1 iterations:

rotate the result ciphertext by $2^i$ to generate a rotated ciphertext, wherein i is the iteration number;

multiply the result ciphertext by the rotated ciphertext to produce a new result ciphertext of n/2 terms;

perform a scalar multiplication of the m−1$^{th}$ result ciphertext with a leading coefficient of the polynomial, resulting in a final polynomial evaluation result; and estimate, according to the final polynomial evaluation result, an operation not supported under fully homomorphic encryption.

9. The system of claim 8, wherein the fully homomorphic encryption comprises the Cheon-Kim-Kim-Song scheme.

10. The system of claim 8, wherein the first input ciphertext is encrypted by a user and provided as an input.

11. The system of claim 8, wherein the first input ciphertext is generated by duplicating a value x within a circuit.

12. The system of claim 8, wherein the first input ciphertext is generated by:

a fourth ciphertext provided by a user containing a value x in the first slot of n/2 slots;

iteratively, for a total of m−1 iterations:

rotating x one slot to the right of the fourth ciphertext to generate a fifth ciphertext; and adding the fourth ciphertext to the fifth ciphertext, with the rotation offset increases by a factor of 2 each iteration.

13. The system of claim 8, wherein, when the first input ciphertext contains a batch of up to 2S/n inputs, wherein S is the number of slots in a ciphertext, the processors further execute program instructions to cause the system to:

duplicate each input n/2 times, filling up to all S slots of input ciphretext; and proceed with the steps of claim 8, wherein all operations are carried out in single-instruction-multiple-data fashion for all input samples in parallel, producing up to 2S/n evaluation results.

14. The system of claim 8, wherein, for two polynomials of different degrees, the processors further execute program instructions to cause the system to:

order the polynomials into respective ciphertexts according to the degrees of the polynomials;

when the ciphertext of the polynomial of higher degree has half of its slots free after i rotation and multiplication iterations, merge the ciphertext of the polynomial of smaller degree into the ciphertext of the polynomial of higher degree to form a single merged ciphertext; and compute the two ciphertexts in parallel using the single merged ciphertext.

15. A computer program product for evaluating polynomials for use under fully homomorphic encryption, the computer program product comprising:

a persistent storage medium having program instructions configured to cause one or more processors to:

receive an input polynomial of degree n for use under fully homomorphic encryption, wherein n is equal to $2^m$;

receive a first input ciphertext containing an input value on which to evaluate the polynomial, wherein the input value is duplicated in n/2 slots;

subtract, from first input ciphertext, two plaintext vectors that respectively contain half of the roots in the polynomial in n/2 slots, obtaining a second ciphertext and a third ciphertext;

multiply the second ciphertext and the third ciphertext elementwise to produce a result ciphertext comprising n/2 slots, wherein each slot contains a product of a different pair of respective terms in the second and third ciphertexts;

iteratively, for a total of m−1 iterations:

rotate the result ciphertext by $2^i$ to generate a rotated ciphertext, wherein i is the iteration number;

multiply the result ciphertext by the rotated ciphertext to produce a new result ciphertext of n/2 terms;

perform a scalar multiplication of the m−1$^{th}$ result ciphertext with a leading coefficient of the polynomial, resulting in a final polynomial evaluation result; and estimate, according to the final polynomial evaluation result, an operation not supported under fully homomorphic encryption.

16. The computer program product of claim 15, wherein the fully homomorphic encryption comprises the Cheon-Kim-Kim-Song scheme.

17. The computer program product of claim 15, wherein the first input ciphertext is encrypted by a user and provided as an input.

18. The computer program product of claim 15, wherein the first input ciphertext is generated by duplicating a value x within a circuit.

19. The computer program product of claim 15, wherein the first input ciphertext is generated by:

a fourth ciphertext provided by a user containing a value x in the first slot of n/2 slots;

iteratively, for a total of m−1 iterations:

rotating x one slot to the right of the fourth ciphertext to generate a fifth ciphertext; and adding the fourth ciphertext to the fifth ciphertext, with the rotation offset increases by a factor of 2 each iteration.

20. The computer program product of claim 15, wherein, when the first input ciphertext contains a batch of up to 2S/n inputs, wherein S is the number of slots in a ciphertext, further comprising program instructions configured to cause the one or more processors to:

duplicate each input n/2 times, filling up to all S slots of input ciphretext; and proceed with the steps of claim 15, wherein all operations are carried out in single-instruction-multiple-data fashion for all input samples in parallel, producing up to 2S/n evaluation results.

21. The computer program product of claim 15, wherein, for two polynomials of different degrees, further comprising program instructions configured to cause the one or more processors to:

order the polynomials into respective ciphertexts according to the degrees of the polynomials;

when the ciphertext of the polynomial of higher degree has half of its slots free after i rotation and multiplication iterations, merge the ciphertext of the polynomial of smaller degree into the ciphertext of the polynomial of higher degree to form a single merged ciphertext; and compute the two ciphertexts in parallel using the single merged ciphertext.

22. A computer-implemented method of evaluating polynomials for use under fully homomorphic encryption, the method comprising:

using a number of processors to perform:

receiving an input polynomial of degree n for use under fully homomorphic encryption, wherein n<2S, where S is a power of 2, and wherein n=n1+n2 such that n1=ceil (n/2);

generating a first ciphertext comprising n1 terms and S−n1 slots set to 1;

generating a second ciphertext comprising n2 terms and S−n2 slots set to 1;

subtracting a first plaintext vector from the first ciphertext, wherein the first vector comprises n1 slots containing the first n1 roots of the polynomial followed by S−n1 zeros;

subtracting a second plaintext vector from the second ciphertext, wherein the second vector comprises n2 slots containing the remaining n2 roots of the polynomial followed by S−n2 zeros;

after subtracting the first and second plaintext vectors, multiplying the first ciphertext and the second ciphertext elementwise to produce a result ciphertext comprising n1 slots, wherein each slot contains a product of a different pair of respective terms in the first and second ciphertexts;

iteratively, for a total of log 2(n)−1 iterations:

rotating the result ciphertext by 2^i to generate a rotated ciphertext, wherein i is the iteration number;

multiplying the result ciphertext by the rotated ciphertext to produce a new result ciphertext of n1 terms;

performing a scalar multiplication of the log 2(n)−1th result ciphertext with a leading coefficient of the polynomial, resulting in a final polynomial evaluation result; and estimating, according to the final polynomial evaluation result, an operation not supported under fully homomorphic encryption.

23. The method of claim 22, wherein the fully homomorphic encryption comprises the Cheon-Kim-Kim-Song scheme.

24. A computer-implemented method of evaluating polynomials for use under fully homomorphic encryption, the method comprising:

using a number of processors to perform:

receiving an input polynomial of degree n for use under fully homomorphic encryption, wherein the polynomial has n roots, and wherein n is equal to a power, m, of 2;

receiving a first ciphertext containing an input value on which to evaluate the polynomial, where the input value is duplicated in n/2 slots;

subtracting from the first ciphertext two plaintext vectors that respectively contain half of the roots in the polynomial in n/2 slots each, obtaining a second and third ciphertexts;

multiplying the second ciphertext and the third ciphertext elementwise to produce a result ciphertext comprising n/2 slots, wherein each slot contains a product of a different pair of respective terms in the second and third ciphertexts;

iteratively multiplying the result ciphertext by a rotated version of itself for m−1 iterations, wherein rotation increases by a power of 2 each iteration;

multiplying a final result ciphertext by a leading coefficient of the polynomial, wherein the final result ciphertext encrypts the product of all differences of the input from the n roots of the polynomial, resulting in a final polynomial evaluation result that is duplicated in all slots of the final result ciphertext; and estimating, according to the final polynomial evaluation result, an operation not supported under fully homomorphic encryption.

25. The method of claim 24, wherein the fully homomorphic encryption comprises the Cheon-Kim-Kim-Song scheme.

* * * * *